US012359809B2

(12) United States Patent
Pearson et al.

(10) Patent No.: US 12,359,809 B2
(45) Date of Patent: Jul. 15, 2025

(54) BACK LIT TEMPERATURE KNOB

(71) Applicants: James E. Pearson, Itasca, IL (US); Timothy M. Wright, Itasca, IL (US)

(72) Inventors: James E. Pearson, Itasca, IL (US); Timothy M. Wright, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 580 days.

(21) Appl. No.: 17/836,085

(22) Filed: Jun. 9, 2022

(65) Prior Publication Data

US 2022/0397273 A1 Dec. 15, 2022

Related U.S. Application Data

(60) Provisional application No. 63/209,455, filed on Jun. 11, 2021.

(51) Int. Cl.

| | |
|---|---|
| ***F23N 1/08*** | (2006.01) |
| ***F21V 33/00*** | (2006.01) |
| ***F24H 9/20*** | (2022.01) |
| ***G05G 1/10*** | (2006.01) |

(52) U.S. Cl.

CPC ............ *F23N 1/087* (2013.01); *F21V 33/006* (2013.01); *F24H 9/20* (2013.01); *F24H 9/2035* (2013.01); *G05G 1/105* (2013.01); *F23N 2225/08* (2020.01); *F24H 9/2007* (2013.01)

(58) Field of Classification Search

CPC ........ F23N 1/087; F23N 2225/08; F23N 5/10; F23N 2235/24; F23N 2239/04; F23N 2241/04; F21V 33/006; F24H 9/20; F24H 9/2035; F24H 9/2007; G05G 1/105

See application file for complete search history.

(56) References Cited

U.S. PATENT DOCUMENTS

| | | | | | |
|---|---|---|---|---|---|
| 2,285,374 | A * | 6/1942 | Dobsmann | H03J 5/12 | 116/DIG. 28 |
| 2,548,760 | A * | 4/1951 | Allgeyer | H05B 3/342 | 362/253 |
| 2,750,918 | A * | 6/1956 | Willman | H01H 19/025 | 116/DIG. 5 |
| 2,763,231 | A * | 9/1956 | Neugass | G05G 1/10 | D13/174 |
| 3,203,265 | A * | 8/1965 | Flegel | G05D 23/1951 | 74/124 |
| 3,535,282 | A * | 10/1970 | Rogers | G03B 15/03 | 200/83 T |
| 3,810,064 | A * | 5/1974 | Flegel | H05B 1/0225 | 236/46 R |
| 4,285,662 | A * | 8/1981 | Katchka | F23Q 9/14 | 431/53 |

(Continued)

*Primary Examiner* — Kristina M Deherrera
*Assistant Examiner* — Tania Courson
(74) *Attorney, Agent, or Firm* — Miller & Martin PLLC

(57) ABSTRACT

A backlit temperature control knob for water heater valves used with water heaters and more particularly to gas water heaters provides a way to read the temperature indication not previously known in the art. Some embodiments rely on a thermocouple or thermopile normally used to power a safety magnet with the pilot light system as a source of electrical energy to selectively illuminate a Light Emitting Diode (LED) which directs light through at least a portion of the knob to assist in reading the temperature indications.

17 Claims, 1 Drawing Sheet

(56) References Cited

U.S. PATENT DOCUMENTS

| | | | | | |
|---|---|---|---|---|---|
| 4,695,739 | A * | 9/1987 | Pierce | H05B 47/185 | 307/132 M |
| 5,101,471 | A * | 3/1992 | Bill | F24H 15/395 | 74/553 |
| 5,138,538 | A * | 8/1992 | Sperling | F21L 4/00 | 362/802 |
| 5,808,294 | A * | 9/1998 | Neumann | H05B 47/11 | 315/159 |
| 5,994,844 | A * | 11/1999 | Crawford | H05B 39/042 | 362/4 |
| 6,745,725 | B2 * | 6/2004 | Toniolo | F24H 9/2035 | 122/504 |
| 7,145,107 | B2 * | 12/2006 | Nguyen | G05G 1/10 | 219/494 |
| 7,207,689 | B2 * | 4/2007 | Tait | A45C 15/06 | 362/208 |
| 7,772,781 | B2 * | 8/2010 | Bruwer | H05B 47/196 | 315/129 |
| 8,382,309 | B1 * | 2/2013 | Johnston | F21L 4/027 | 362/156 |
| 2002/0121305 | A1 * | 9/2002 | Firestine | F24H 9/20 | 122/451.2 |
| 2005/0092066 | A1 * | 5/2005 | Ruhland | G01N 27/18 | 73/23.31 |
| 2006/0109887 | A1 * | 5/2006 | Joubran | F24H 15/212 | 374/147 |
| 2014/0144395 | A1 * | 5/2014 | Blessing | F24H 9/2035 | 122/19.2 |

* cited by examiner

BACK LIT TEMPERATURE KNOB

CLAIM OF PRIORITY

This application claims the benefit of U.S. Provisional Patent Application No. 62/209,455 filed Jun. 11, 2021, which is incorporated herein by reference in its entirety.

FIELD OF THE INVENTION

The present invention relates to gas water heater temperature adjustment knobs and more particularly to back lit temperature knobs for non-electrically powered gas water heater valves.

BACKGROUND OF THE INVENTION

Currently all gas valves used for traditional gas hot water heating tanks that are non-powered from an external electrical source (such as 110 volts AC outlet, breaker, etc.) have a knob to adjust the temperature on the hot water heater. Because the knobs are located on the gas valve, normally at the bottom of the tank, in many cases in a dark basement or garage, they are often very hard to read. If one forgets their flashlight when they go to check the temperature setting on the gas water heater, they could be adjusting somewhat blindly. Not only can the pointer be difficult to see on the valves, the knob can also be difficult to read.

There is some electrical power in the valve is received from a thermocouple normally utilized to power a safety device related to the pilot light. These type gas water heaters are not normally connected to household electricity. To the extent any electricity is present, it is generated at the water heater is from a thermopile or thermocouple normally for safety related purposes-normally to hold open the pilot light gas flow valve so that if the voltage were secured (such as if the pilot light went out thereby causing the thermocouple to cool), the pilot light gas valve would close.

SUMMARY OF THE INVENTION

It is an object of many embodiments of the present invention to provide a temperature control knob for use with a non-powered gas water heater having a back lit display feature under at least some certain circumstances.

It is an object of many embodiments of the present invention to provide an improved back lit control knob for use with water heaters and more particularly for gas water heaters not receiving external sources of electricity.

Accordingly, in accordance with many embodiments of the present invention a gas water heater valve receives very low power such as from a thermocouple or thermopile in the water heater directing that electrical power internal to the valve. This electrical power is normally utilized for the safety magnet or other purposes internal to the valve such as to allow the valve to shut off such if the pilot light goes out or other purpose. The voltage generated by the thermocouple is often between 30 and 100 mV.

The applicant proposes to provide a temperature control knob that either has a cutout, a translucent skirt or other translucent or transparent portion so as to show an indication of temperature when lighted from beside, or more preferably, behind the knob, upon depressing a button either external to the knob or the knob itself, preferably a single LED (Light Emitting Drode) illuminates although multiple LEDs could be illuminated thereby shining at least some light preferably through the knob if not onto the rear of the knob thereby providing a user sufficient light to be able to read the temperature indicia on the knob during operation of the knob and/or while depressing the button/knob. In many embodiments the LED is only lit when the button or knob is pressed so as to conserve power which is normally utilized for the safety feature of the valve as described above. A capacitor and/or voltage steppers may be useful to provide the desired voltage power for a sufficient time to operate the LED of this lighting feature.

DETAILED DESCRIPTION OF THE PREFERRED EMBODIMENT

Figure 1:
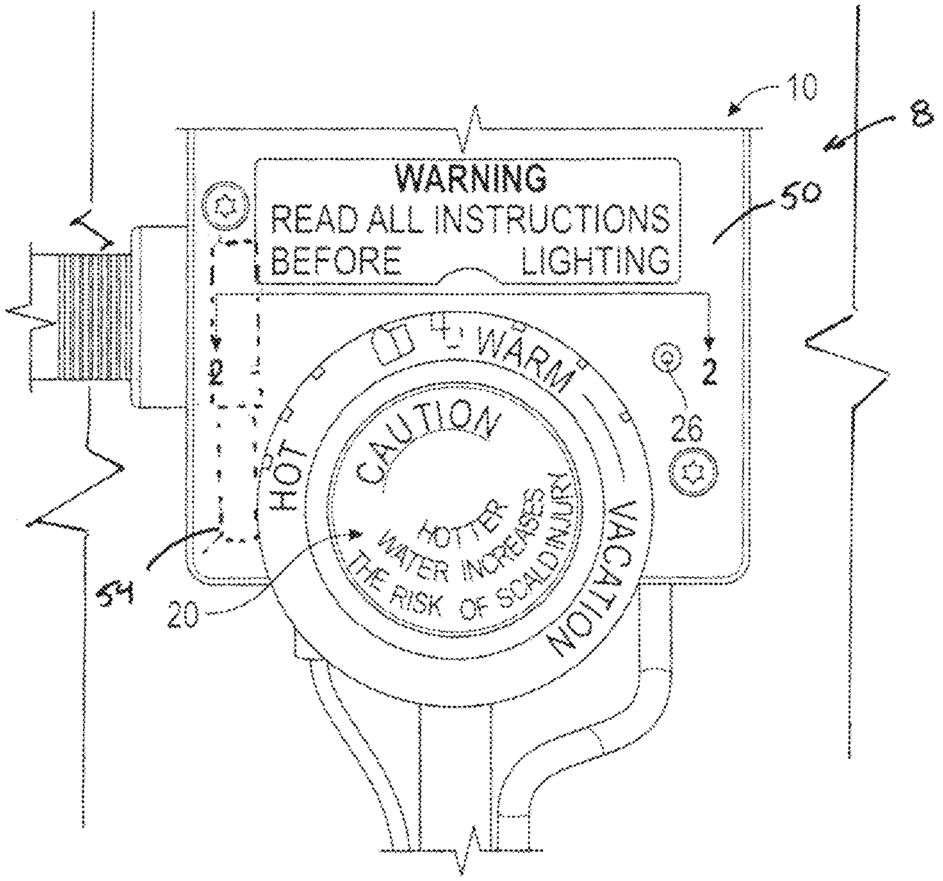
FIG. 1 is a front plan view of a valve of a water heater of a presently preferred embodiment of the present invention.
Figure 2:
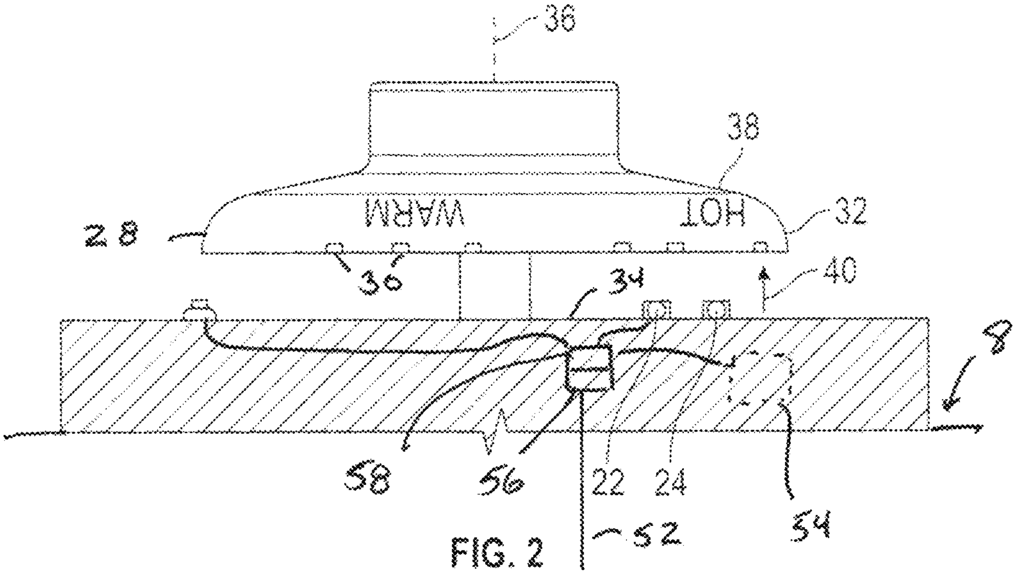
FIG. 2 is a side plan view taken along the line AA in FIG. 1 of the presently preferred embodiment of the present invention.

FIG. 1 shows a valve 10 of the presently preferred embodiment of the present invention having a temperature control knob 20 extending relative to valve cover 50 as used with gas water heater 8. While many prior art valves have temperature control knobs, this temperature control knob 20 and valve 10 are different. The temperature control knob 20 of the present invention is back lit by an LED 22 as shown in FIG. 2 as will be explained in further detail below. Specifically, the knob 20 is preferably equipped with a skirt 28 whereby when an activator is depressed, which could potentially be a separate button 26 as illustrated or alternatively could be activated upon pushing the knob 20 along rotational axis 36 the LED 22 toward the LED 22 is lit so as to back light the knob 20. Other actuators could be used with other embodiments. Specifically, the skirt 28 may preferably be at least translucent if not transparent (or provide cutouts) at least along temperature indicia or indicators 30 which can not only be the wording such as hot, warm, vacation, etc., but could also be the letters or marks provided along or near the circumference at the edge 32 of the knob 20.

These indicia temperature points or temperature indicators 30 are useful to align with a pointer 24 as normally occurs in the prior art. However, what is different about the applicant's valve 10 is that upon depressing the activator, whether that be the button 26 or the knob 20 such as along rotational axis 36 in the direction of the pointer 24 or LED 22. The LED 22 receives electrical power so as to illuminate the temperature indicators 30 from behind which may be provided through the at least translucent skirt 28, if not transparent except for possibly with the exception of the letters or alternatively the letters could be cut out or otherwise provided (such as could glow a different color than the rest of the skirt 28, etc.) so as to in some way distinctively identify the temperature indicators 30 indicia and possibly the pointer 24 particularly those temperature indicators 30 close to the LED 22. Reflector 34 may be useful to assist in reflecting light through the skirt 28, etc. Other devices may be utilized to reflect onto a front face 38 of the skirt 28 such as from the side, etc. but it is anticipated that for many preferred embodiments, the light will be directed from behind or underneath 40 the knob 20 and thus through the knob 20 to illuminate the temperature indicators 30 on the knob 20, possibly while also illuminating the pointer 24. Some embodiments may have the LED 22 be on the knob 20 or be a portion of the pointer 24.

It should be remembered that the power for the valve 10 is provided from the thermocouple normally so that the pilot light goes out, the pilot light gas feed is shut off by the valve 10. The thermocouple normally provides 30-100 mv which can be provided internal to the LED 22 either directly or indirectly such as through a voltage step up mechanism (voltage stepper 56) as they are well known in the art) and possibly even to a capacitor 58 so as to be able to provide the sufficient voltage for a sufficient period of time to the LED 22 such as at least about ten seconds if not at least about twenty seconds of light when activated so they user may see sufficiently to be able to see the setting of the temperature if not change the setting of the temperature with the knob 20.

The voltage generating temperature sensor 52 such as thermocouple (not shown or thermopile) normally provides a safety magnet 54 or a thermistor magnet to be energized. In order to conserve power, the LED 22 preferably only lights when the activator is depressed or for a set period of time after depressing the activator as described above.

Temperature indicators 30 and/or skirt 28 may take various forms in many embodiments. Cutouts could be provided for temperature indicators 30 if not coloration or other effects, such as on a transparent or translucent skirt (or possibly only the indicators 30 could be transparent/translucent in various embodiments.

What is claimed:

1. A water heater lighted temperature adjustment valve and gas water heater combination comprising:

ras water heater having one of a thermocouple and a thermopile normally providing power to a safety magnet, said as water heater not connected to an external electrical source, a manual control knob having temperature indications displayed on a front face of the knob, said manual control knob extending from a front of a valve cover;

one of a cutout, a transparent portion, and a translucent portion permitting at least some light to pass through the knob from behind to at least selectively illuminate at least a portion of the temperature indications;

a light source selectively directing light through the knob, said one of the thermocouple and thermopile also serving as an electrical power source for the light source; and an activator, wherein upon activation, the light source at least temporarily provides light thereby illuminating the at least a portion of the temperature indications.

2. The water heater lighted temperature adjustment valve of claim 1 wherein the electrical power source operates at less than 100 m V.

3. The water heater lighted temperature adjustment valve of claim 1 wherein upon activation, the light source is illuminated for less than 20 seconds.

4. The water heater lighted temperature adjustment valve of claim 1 wherein the light source is connected to the front of the valve cover.

5. The water heater lighted temperature adjustment valve of claim 1 further comprising a pointer on the front of the valve cover, said one of the temperature indications selectively aligning with the pointer upon turning of the manual control knob.

6. The water heater lighted temperature adjustment valve of claim 1 wherein the activator is one of a button and an action of pushing the manual control knob toward the front of the valve cover.

7. The water heater lighted temperature adjustment valve of claim 6 wherein the activator is the button on the valve cover spaced from the manual control knob.

8. The water heater lighted temperature adjustment valve of claim 1 wherein the one of a cutout, a transparent portion, and a translucent portion is located on a skirt extending radially outwardly on the manual control knob.

9. The water heater lighted temperature adjustment valve of claim 8 wherein the skirt is radially spaced from a rotational axis of the manual control knob.

10. The water heater lighted temperature adjustment valve of claim 1 further comprising one of a capacitor and a voltage stepper receiving an input from the electrical power source and then directing power to the light source.

11. The water heater lighted temperature adjustment valve of claim 10 wherein the electrical power source operates at less than 100 mV.

12. The water heater lighted temperature adjustment valve of claim 11 wherein the activator is one of a button and an action of pushing the manual control knob toward the front of the valve cover.

13. The water heater lighted temperature adjustment valve of claim 12 wherein the activator is the button on the valve cover spaced from the manual control knob.

14. The water heater lighted temperature adjustment valve of claim 4 wherein the electrical power source operates at less than 100 mV.

15. The water heater lighted temperature adjustment valve of claim 4 wherein the activator is one of a button and an action of pushing the manual control knob toward the front of the valve cover.

16. The water heater lighted temperature adjustment valve of claim 15 wherein the activator is the button on the valve cover spaced from the manual control knob.

17. The water heater lighted temperature adjustment valve of claim 16 further comprising a pointer on the front of the valve cover, one of the temperature indications selectively aligning with the pointer upon turning of the manual control knob.

* * * * *